United States Patent
Sonntag et al.

(10) Patent No.: US 9,897,319 B2
(45) Date of Patent: Feb. 20, 2018

(54) IGNITER POSITION FOR A COMBUSTOR OF A GAS TURBINE ENGINE

(71) Applicant: UNITED TECHNOLOGIES CORPORATION, Farmington, CT (US)

(72) Inventors: Robert M. Sonntag, Bolton, CT (US); Michael Youssef, Mississauga (CA); Edward B. Harris, West Hartford, CT (US); Richard A. Long, Stuart, FL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 259 days.

(21) Appl. No.: 14/631,082

(22) Filed: Feb. 25, 2015

(65) Prior Publication Data
US 2016/0245517 A1 Aug. 25, 2016

(51) Int. Cl.
F23R 3/00 (2006.01)
F02C 7/264 (2006.01)
F23R 3/60 (2006.01)

(52) U.S. Cl.
CPC .............. *F23R 3/002* (2013.01); *F02C 7/264* (2013.01); *F23R 3/60* (2013.01)

(58) Field of Classification Search
CPC .... F02C 7/26; F02C 7/28; F02C 7/264; F02C 7/266; F23R 3/002; F23R 3/60
See application file for complete search history.

(56) References Cited

U.S. PATENT DOCUMENTS

| 3,048,015 A | 8/1962 | Barrelle et al. |
| 8,099,963 B2 * | 1/2012 | Pieussergues ......... F02C 7/266 60/39.821 |
| 2009/0235635 A1 | 9/2009 | Ryan |

(Continued)

FOREIGN PATENT DOCUMENTS

| EP | 1111219 A2 | 6/2001 |
| EP | 1443190 A1 | 8/2004 |
| EP | 1975512 A2 | 10/2008 |

OTHER PUBLICATIONS

EP SR, dated Jul. 7, 2016.
Eurpoean Search Report Issued in EP Application No. 16 157 297.9-1605; Ref. 16.127645; dated Dec. 4, 2017; 6 Pages.

*Primary Examiner* — Arun Goyal
(74) *Attorney, Agent, or Firm* — Cantor Colburn LLP

(57) ABSTRACT

The present disclosure relates combustor configurations for a gas turbine engine. In one embodiment, a combustor includes a combustor shell enclosing a first area of free space, and an igniter for the combustor shell, the igniter including a distal end. The combustor also includes one or more elements configured to retain the igniter and to interface with the combustor shell, wherein the igniter is retained that the distal end of the igniter is recessed from the first area of free space. According to another embodiment, a combustor configuration may include one or more elements configured to retain an igniter and interface with the combustor shell, wherein the one or more elements define a boundary between the combustor shell and one or more elements, and wherein the igniter is retained within the one or more elements such that the distal end of the igniter is recessed from the boundary.

20 Claims, 3 Drawing Sheets

(56) References Cited

U.S. PATENT DOCUMENTS

2014/0352323 A1    12/2014  Bennett et al.
2015/0040575 A1*   2/2015   Martinez Fabre ...... F02C 7/264
                                                      60/776

* cited by examiner

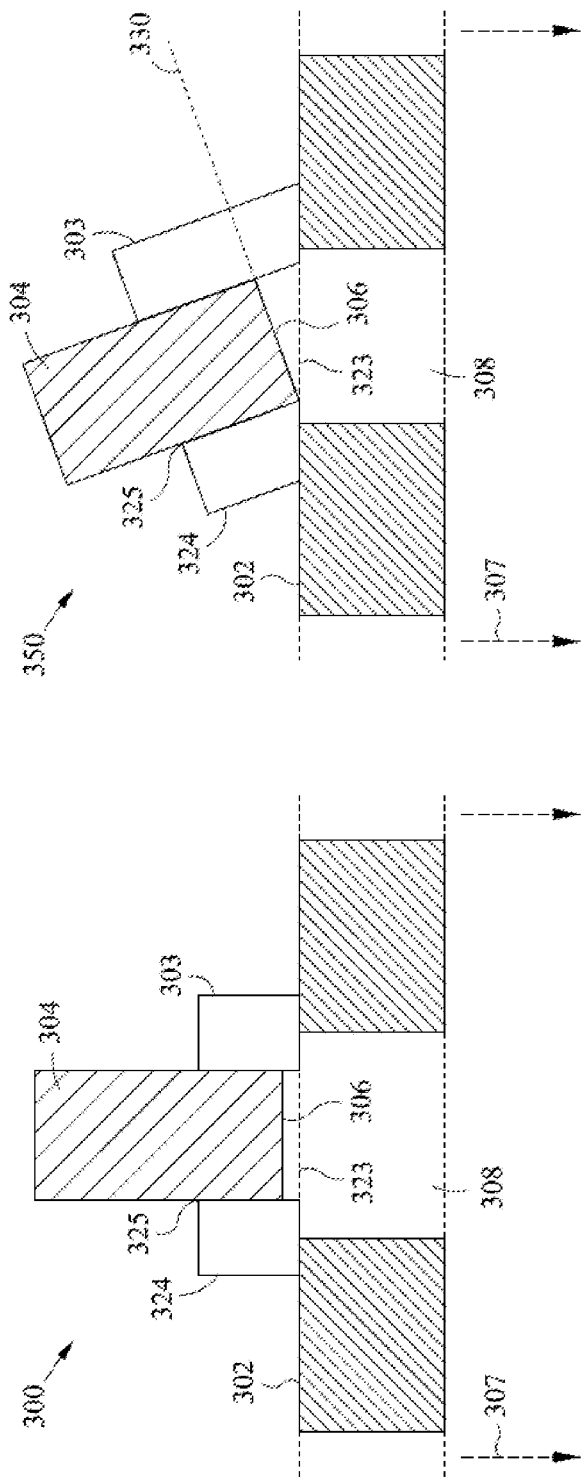
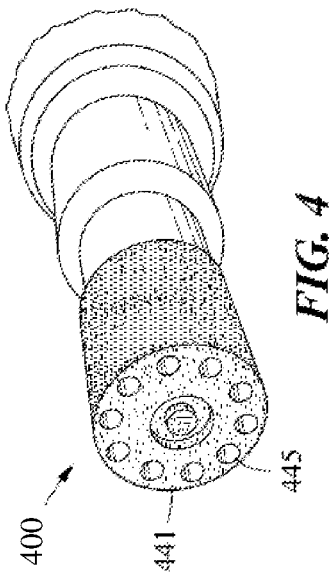
FIG. 3A
FIG. 3B
FIG. 4

IGNITER POSITION FOR A COMBUSTOR OF A GAS TURBINE ENGINE

FIELD

The present disclosure relates to gas turbine engines and, in particular, to combustor and igniter configurations for gas turbine engines.

BACKGROUND

Gas turbine engines are required to operate efficiently during operation and flight. Theses engines create a tremendous amount of force and generate high levels of heat. As such, components of these engines are subjected to high levels of stress, temperature and pressure. It is necessary to provide components that can withstand the demands of a gas turbine engine. It is also desirable to provide components with increased operating longevity.

FIG. 1 depicts a conventional configuration of a combustor 100 including an igniter 105 with the igniter tip 106 protruding into the combustor cavity 110. Many conventional combustor and gas turbine engines include an igniter position with the igniter tip 106 protruding into the combustor cavity 110. This configuration can lead to deformation of the igniter due to extreme temperatures within cavity 110. As a result, the igniter 105, and in particular the igniter tip 106, may deform over time or "mushroom" due to the environment within cavity 110.

Some components of gas turbine engines, such as igniters, are designed to be line replacement units (LRUs). Deformation of the igniter 105, and especially mushrooming of igniter tip 106, may result in great difficulty when removal of igniter 105 is needed. In some cases, igniter deformation will result in a complete overhaul of the engine to remove and replace igniters at a great expense. Accordingly, there is a desire to provide a configuration that allows for operation of a combustor and igniter which overcomes the aforementioned drawbacks. There is also a desire to improve the configuration of gas turbine engines and combustors.

BRIEF SUMMARY OF THE EMBODIMENTS

Disclosed and claimed herein are combustor and igniter configurations for gas turbine engines. One embodiment is directed to a combustor for a gas turbine engine, the combustor including a combustor shell enclosing a first area of free space and an igniter for the combustor shell, the igniter including a distal end. The combustor also includes one or more elements configured to retain the igniter and to interface with the combustor shell, wherein the one or more elements define a second area of free space, and wherein the igniter is retained within the second area of free space such that the distal end of the igniter is recessed from the first area of free space.

In one embodiment, the first area of free space is defined by the inner surface of the combustor shell and one or more liners mounted to an interior of the combustor shell.

In one embodiment, the igniter is recessed from the first area of free space by a fixed distance.

In one embodiment, the first area of free space is separate from the second area of free space.

In one embodiment, the one or more elements extend into the combustor shell.

In one embodiment, the igniter is offset from a boundary between the first area of free space and the second area of free space by a predetermined distance.

In one embodiment, the distal end of the igniter is removed from a direct path of gas flow within the combustor.

In one embodiment, the combustor shell is at least one of an annular and sectional combustor shell.

In one embodiment, the distal end of the igniter is recessed by at least one of a parallel and angled offset from the first area of free space.

In one embodiment, the distal end of the igniter is angularly offset from the first area of free space within the range of 0-45 degrees Another embodiment is directed combustor for a gas turbine engine. The combustor including a combustor shell enclosing a first area of free space and an igniter for the combustor shell, the igniter including a distal end. The combustor also includes one or more elements configured to retain the igniter and interface with the combustor shell, wherein the one or more elements define a boundary between the combustor shell and the one or more elements, and wherein the igniter is retained within the one or more elements such that the distal end of the igniter is recessed from the boundary.

In one embodiment, the first area of free space is defined by the inner surface of the combustor shell and one or more liners mounted to the interior of the combustor shell.

In one embodiment, the igniter is recessed from the boundary by a fixed distance.

In one embodiment, the boundary is a plane between the first area of free space and the area defined by the one or more elements.

In one embodiment, the one or more elements extend into the combustor shell.

In one embodiment, the igniter is offset from the boundary by a predetermined distance.

In one embodiment, the distal end of the igniter is removed from a direct path of gas flow within the combustor.

In one embodiment, the combustor shell is at least one of an annular and sectional combustor shell.

In one embodiment, the distal end of the igniter is recessed by at least one of a parallel and angled offset from the boundary.

In one embodiment, the distal end of the igniter is angularly offset from the boundary within the range of 0-45 degrees Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIGS. 3A-3B depict cross-sectional representations of igniter configurations for a gas turbine engine according to one or more embodiments; and FIG. 4 depicts graphical representation of an igniter for a combustor of a gas turbine engine according to one or more embodiments.

DETAILED DESCRIPTION OF THE EXEMPLARY EMBODIMENTS

Overview and Terminology

One aspect of this disclosure relates to configurations for an igniter relative to a combustor according to one or more embodiments. In one embodiment, a configuration for a combustor is provided including a combustor shell, igniter, and one or more elements to support and/or position an igniter relative to a combustor cavity. A combustor shell, igniter, and igniter support elements may be configured to allow for positioning of an igniter which reduces the exposure of the igniter to hot gas flow.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Figure 1:
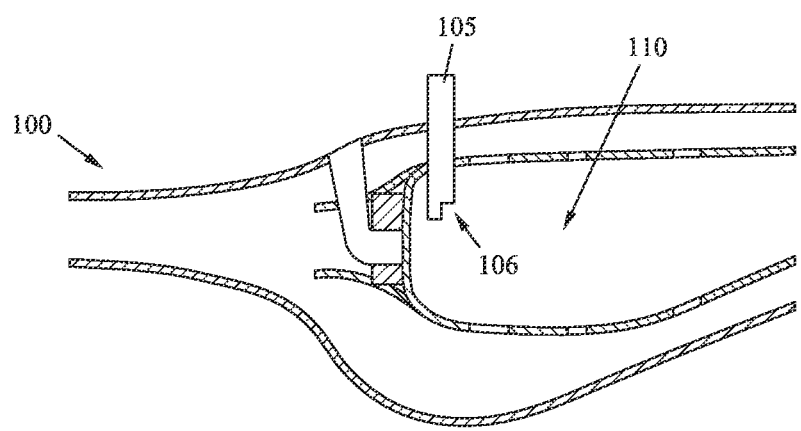
FIG. 1 depicts a graphical representation of a conventional combustor configuration for a gas turbine engine.
Figure 2:
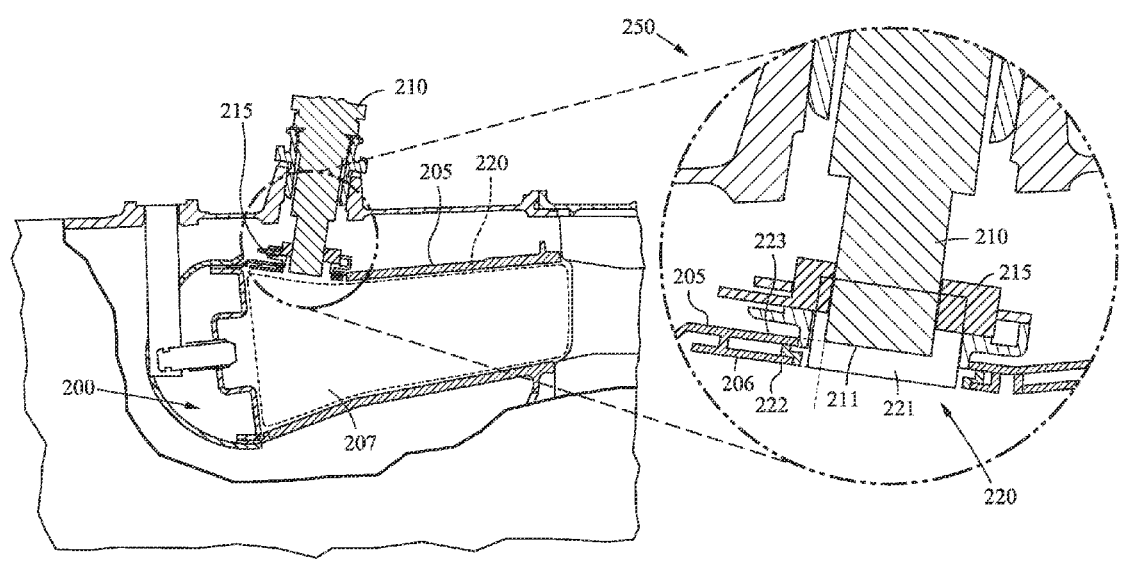
FIG. 2 depicts a cross-sectional representation of a combustor for a gas turbine engine according to one or more embodiments.

FIG. 2 depicts a cross-sectional representation of a combustor 200 according to one or more embodiments. Combustor 200 includes a combustor shell 205, one or more elements shown as support elements 215, and igniter 210. Igniter 210 may be retained relative to combustor shell 205 and/or supported by support elements 215. The configuration of combustor 200 may allow for positioning of an igniter within combustor shell 205 to prevent deformation of the igniter 210 and improve life-on-wing for igniters. According to one embodiment, igniter 210 may be recessed from a boundary to reduce high heat exposure of distal end 211. Recessing igniter 210 decreases structural deformities to the igniter, decreases heat exposure, and can increase component efficiency by reducing required parasitic cooling flow. Recessing igniter 210 can improve ignition performance. Additionally, structural deformities of igniter 210 increase the cost of repairs and maintenance of gas turbine engines.

Combustor shell 205 encloses a first area of free space 220 within the combustor shell 205. The combustor shell 205 is at least one of an annular and sectional combustor shell. According to one embodiment, the first area of free space 220 is defined by the inner surface of the combustor shell 205 and one or more liners mounted to the interior of the combustor shell 205.

Igniter 210 for combustor shell 205 may be mounted, by support elements 215, relative to the combustor shell 205 to ignite fuel and air mixture within the combustor. According to one embodiment igniter 210 includes a distal end, the distal end may include one or more electrodes for ignition of the gas flow path within the combustor shell 205. In one embodiment, the distal end of the igniter 210 is a substantially flat surface including an electrode. Igniter 210 may be a cylindrically shaped device.

Combustor 200 includes support elements 215 configured to retain the igniter 210 and to interface with the combustor shell 205. Support element 215 can define a second area of free space. In certain embodiments, support elements 215 extend into the combustor shell 205. Support elements 215 may include one or more of an igniter tube, and one or more support rings.

An enlarged view of the combustor shell 205 and support elements 215 is shown as 250 in FIG. 2. Combustor shell is shown with a liner 206. According to one or more embodiments, support elements 215 extend into an opening with the combustor shell 205. Support elements 215 define a second area of free space 221. In certain embodiments, first area of free space 220 and second area of free space 221 do not overlap. Igniter 210 is retained within the second area of free space 221 such that the distal end 211 of the igniter 210 is recessed from the first area of free space 220. Recessing the igniter 210 can remove the distal end 211 out of the gas flow path such that the area of the igniter 210 that is exposed to high gas path temperatures is reduced or minimized.

According to one embodiment, the boundary between first area of free space 220 and second area of free space 221 is shown as 222. According to another embodiment, the face of igniter 210 is shown recessed to positioned 223, wherein position 223 is offset and/or recessed from first area of free space 220. In addition, the face of igniter 210 is shown recessed to positioned 223, wherein position 223 is offset and/or recessed from boundary 222.

In one embodiment, combustor 200 may allow for positioning and/or placement of an igniter 210 relative to a first area of free space 220 within combustor shell 205. Support elements 215 can retain igniter 210 within the second area of free space such that the distal end of the igniter is recessed from the first area of free space 220. As such, recessed can relate to a fixed distance of displacement from the first area of free space 220. In certain embodiments, the first area of free space 220 is separate from the second area of free space. The distal end of the igniter may be recessed by at least one of a parallel and angled offset from the first area of free space 220.

According to another embodiment, the igniter is offset from a boundary between the first area of free space and the second area of free space by a predetermined distance. As such, the distal end of the igniter 210 is removed from a direct path of gas flow within the combustor 200.

According to another embodiment, combustor 200 may allow for positioning and/or placement of an igniter 210 relative to a boundary between first area of free space 220 and support elements 215. Igniter 210 may be recessed a fixed distance of displacement from the boundary 222 to position 223. Recess plane 223 is offset from the boundary 222 between by a predetermined distance. In that fashion, the distal end 211 of the igniter 210 is recessed by at least one of a parallel and angled offset from the boundary 222.

Support elements 215 can retain igniter 210 within the second area of free space such that the distal end of the igniter is recessed from boundary 222. As such, recessed can relate to a fixed distance of displacement from the first area of free space 220. In certain embodiments, the first area of free space 220 is separate from the second area of free space 221. The distal end of the igniter 210 may be recessed by at least one of a parallel and angled offset from the boundary 222.

According to another embodiment, igniter 210 is offset from a boundary between the first area of free space and the second area of free space by a predetermined distance. As such, the distal end of the igniter 210 is removed from a direct path of gas flow within the combustor 200. In certain embodiments, boundary 222 is a plane between the first area of free space 220 and the area defined by the support elements 215.

According to one embodiment, offset of igniter 210 from first area of free space 220, or boundary 222, relates to a set point for positioning igniter 210. In certain embodiments, igniter 210 is offset a fixed distance of 0.036 inches. In other embodiments, igniter 210 is offset a fixed distance within the range of 0.015 to 0.060 inches. In yet another embodiment, igniter 210 is offset a fixed distance within a given tolerance. By way of example, the offset of igniter 210 may vary during installation, based on the installer or other factors. Accordingly, support elements 215 may be configured to allow for positioning to an offset, and/or one or more positions within a tolerance of the fixed distance.

FIGS. 3A-3B depict cross-sectional representations of igniter configurations for a gas turbine engine according to one or more embodiments.

FIG. 3A depicts a cross-sectional representation of igniter configuration 300 for a gas turbine engine according for combustor shell 302, igniter 304, and support elements 303. Combustor shell 302 encloses a first area of free space, shown by 307. Igniter 304 for the combustor shell 302 includes a distal end 306. Distal end 306 of igniter 304 is a substantially flat surface with an electrode. According to one embodiment, distal end 306 of igniter 304 is offset from the first area of free space a fixed distance within the range of 0.015 to 0.055 inches.

Support elements 303 are configured to retain the igniter 304 and interface with the combustor shell 302. Support elements 303 can extend into an opening with the combustor shell 302. Support elements 303 define a second area of free space 308. First area of free space 307 and second area of free space 308 do not overlap. Igniter 304 is retained within the second area of free space 308 such that the distal end 306 of the igniter 304 is recessed from the first area of free space 307. In another embodiment, the support elements 303 define a boundary 323 between the combustor shell 302 and support elements 303. Boundary 323 prevents overlapping of the combustor shell 302 and igniter tube 303. Igniter 304 is retained within the igniter tube 303 such that the distal end 306 of the igniter 304 is recessed from the boundary 323. Recessed is offset from the boundary 323 a predetermined distance. Recessed can also be near but out of the gas flow. Near but out of the gas flow can be not exposed to a high temperature but close enough to allow ignition of combustible gasses.

FIG. 3B depicts a cross-sectional representation of a combustor 350 for a gas turbine engine according to one or more embodiments. Igniter 304 is retained within the igniter tube 303 such that the distal end 306 of the igniter 304 is recessed from the boundary 323. Recessed is offset from the boundary 323 a predetermined distance. Recessed can also be near but out of the gas flow. Igniter 210 recessed can also be where distal end 206 surface is positioned parallel or at a predetermined angled 330. According to one embodiment, distal end 306 of igniter 304 is angularly offset from the boundary within the range of 0-45 degrees.

FIG. 4 depicts graphical representation of an igniter for a combustor of a gas turbine engine according to one or more embodiments. Igniter 400 includes a distal end 445. Positioning igniter 400 in a recessed position reduces extreme high heat exposure of distal end 445 and can remove the igniter 400 from the direct flow path of the fuel and gas mixture of combustor. Reduced exposure of distal tip 445 to extreme high temperature causes less structural deformities 441 and increased operating longevity.

While this disclosure has been particularly shown and described with references to exemplary embodiments thereof, it will be understood by those skilled in the art that various changes in form and details may be made therein without departing from the scope of the claimed embodiments.

What is claimed is:

1. A combustor for a gas turbine engine, the combustor comprising:
    a combustor shell enclosing a first area of free space, the combustor shell having a first shell surface and a second shell surface opposite the first shell surface;
    a combustor liner disposed radially inboard of the combustor shell, the combustor liner having a first liner surface and a second liner surface opposite the first liner surface such that the first liner surface faces the second shell surface, the second liner surface faces an interior of the combustor, and the first shell surfaces faces away from the interior of the combustor;
    an igniter for the combustor shell, the igniter including a distal end proximate the combustor shell and a second end radially outward of the distal end; and
    one or more elements configured to retain the igniter and to interface with the combustor shell, wherein the one or more elements define a second area of the free space, and wherein the igniter is retained at the second area of the free space such that the distal end of the igniter is radially outward from the combustor shell.

2. The combustor of claim 1, wherein the first area of free space is defined by the second shell surface of the combustor shell and the first liner surface of the combustor liner.

3. The combustor of claim 1, wherein the igniter is recessed from the first area of the free space by a fixed distance.

4. The combustor of claim 1, wherein the first area of the free space is separate from the second area of the free space.

5. The combustor of claim 1, wherein the one or more elements extend into the combustor shell.

6. The combustor of claim 1, wherein the igniter is offset from a boundary between the first area of the free space and the second area of the free space by a predetermined distance.

7. The combustor of claim 1, wherein the distal end of the igniter is removed from a direct path of gas flow within the combustor.

8. The combustor of claim 1, wherein the combustor shell is at least one of an annular and sectional combustor shell.

9. The combustor of claim 1, wherein the distal end of the igniter is recessed by at least one of a parallel and angled offset from the first area of the free space.

10. The combustor of claim 1, wherein the distal end of the igniter is angularly offset from the first area of the free space within the range of 0-45 degrees.

11. A combustor for a gas turbine engine, the combustor comprising:

a combustor shell enclosing a first area of free space, the combustor shell having a first shell surface and a second shell surface opposite the first shell surface;

a combustor liner disposed radially inboard of the combustor shell, the combustor liner having a first liner surface and a second liner surface opposite the first liner surface such that the first liner surface faces the second shell surface, the second liner surface faces an interior of the combustor, and the first shell surfaces faces away from the interior of the combustor;

an igniter for the combustor shell, the igniter including a distal end proximate the combustor shell and a second end radially outward of the distal end; and one or more elements configured to retain the igniter and interface with the combustor shell, wherein the one or more elements define a second area of the free space, the combustor shell defining a boundary between the first area of the free space and the second area of the free space, and wherein the igniter is retained within the one or more elements such that the distal end of the igniter is radially outward from the boundary.

12. The combustor of claim 11, wherein the first area of the free space is defined by the second shell surface of the combustor shell and the first liner surface of the combustor liner.

13. The combustor of claim 11, wherein the igniter is recessed from the boundary by a fixed distance.

14. The combustor of claim 11, wherein the boundary is a plane between the first area of the free space and an area defined by the one or more elements.

15. The combustor of claim 11, wherein the one or more elements extends into the combustor shell.

16. The combustor of claim 11, wherein the igniter is offset from the boundary by a predetermined distance.

17. The combustor of claim 11, wherein the distal end of the igniter is removed from a direct path of gas flow within the combustor.

18. The combustor of claim 11, wherein the combustor shell is at least one of an annular and sectional combustor shell.

19. The combustor of claim 11, wherein the distal end of the igniter is recessed by at least one of a parallel and angled offset from the boundary.

20. The combustor of claim 11, wherein the distal end of the igniter is angularly offset from the boundary within the range of 0-45 degrees.

* * * * *